March 25, 1924.
A. H. DEMKE ET AL
1,488,197
AUTOMATIC AIR SHOCK ABSORBER
Filed June 27, 1922
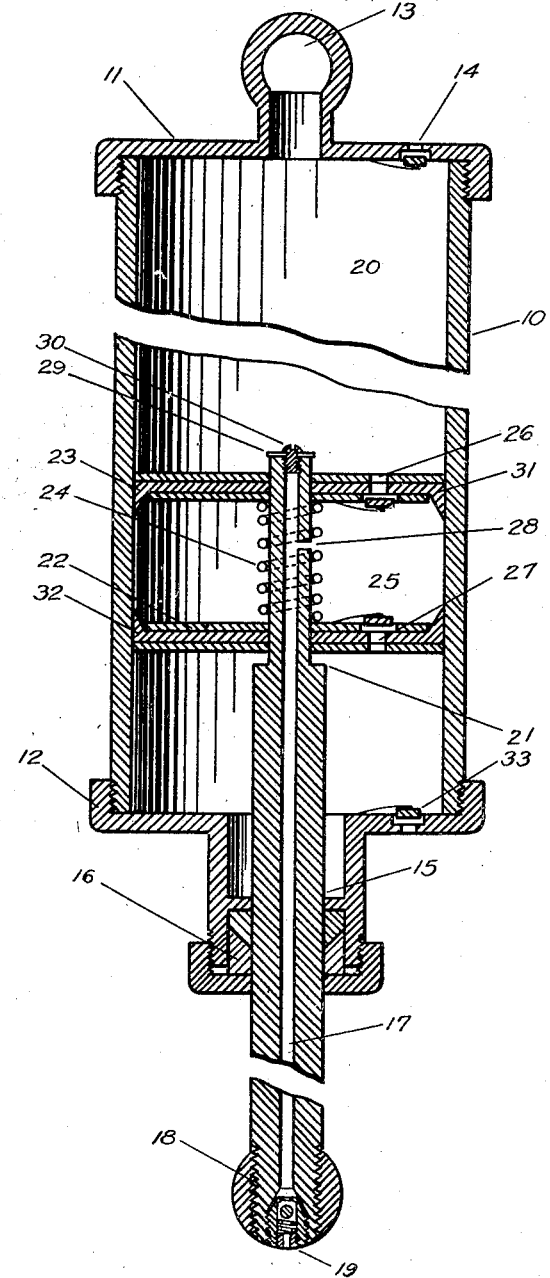
INVENTORS
Albert H. Demke
BY Daniel L. Pope
ATTORNEY Patented Mar. 25, 1924.

1,488,197

UNITED STATES PATENT OFFICE.

ALBERT H. DEMKE, OF LAKEWOOD, OHIO, AND DANIEL K. POPE, OF OKLAHOMA CITY, OKLAHOMA, ASSIGNORS OF ONE-THIRD TO WILLIAM A. KELLY, OF SULPHUR, OKLAHOMA.

AUTOMATIC AIR SHOCK ABSORBER.

Application filed June 27, 1922. Serial No. 571,174.

*To all whom it may concern:*

Be it known that we, ALBERT H. DEMKE, a citizen of the United States, residing at 14582 Bayes Avenue, in the city of Lakewood, in the county of Cuyahoga and State of Ohio, and DANIEL K. POPE, a citizen of the United States, residing at No. 821 West 8th St., in the city of Oklahoma City, in the county of Oklahoma and State of Oklahoma, have invented a new and useful Improved Automatic Air Shock Absorber, of which the following is a clear and exact description.

This invention relates to air absorption of shocks and rebounds incident to the operation of springs on vehicles, such as automobiles, railway cars, etc., by the automatic use of air. With the foregoing and other objects in view, the invention consists in the arrangement and combination of parts hereinafter described, and which invention is not restricted to the exact details of construction disclosed or suggested herein. Still, for the purposes of illustrating a practical embodiment thereof, reference is had to the accompanying drawing, in which like characters designate the same parts in the several views, and in which the figure is a vertical longitudinal section showing the main portions of this invention. Referring more particularly to the drawing for a full explanation of the construction and its functions, it will be noted that this invention comprises a tubular cylinder 10, having a cap 11, secured to its upper end, and a cap 12 closing the lower end thereof, thereby forming chamber 20. Cap 11 is so arranged that its upper portion embodies a hollow ball 13, the upper part of which is arranged to fit into a socket on the outside and act as a support for the shock absorber. Cap 11 is also equipped with a valve 14, opening inwardly into chamber 20. Cap 12 has the central hole 15, adapted to be sealed by means of a packing gland 16, of well known construction. Cap 12 is provided with a valve 33, opening inwardly into chamber 20.

The other main portion of the invention comprises a hollow rod 17, fitted slidably through the hole 15, and packing gland 16, on the lower end of which is attached a round ball 18, the outer part of which is arranged to fit into a socket on the axle of the vehicle. Ball 18 is equipped with a valve 19 opening outwardly from the hollow piston rod 17. The upper end of the piston rod 17 is turned down, leaving a slide shoulder at 21. Two pistons, 22 and 23, are slidably mounted on piston rod 17 above shoulder 21. Coil spring 24 is slidably mounted on piston rod 17, the sole purpose of which is to hold pistons 22 and 23 in place until piston rod 17 is put in motion by operation of vehicle. The span between the pistons 22 and 23 is a high pressure air chamber 25. Piston 23 is provided with a valve 26, opening inwardly into the chamber 25. The piston 22 is provided with valve 27 and opening inwardly into chamber 25. A port 28 is provided through the wall of the piston rod 17 midway between the piston 22 and piston 23. A washer 29 is attached to the top of piston rod 17 by screw 30 acting as a shoulder to limit action of piston 23 and to seal the upper end of the piston rod 17.

The method of operation of this device may be described as follows:

Assuming that ball 13 is fastened to the body of a vehicle and ball 18 is fastened to the axle of said vehicle, by means of proper fitting, this would cause our invention to span the spring at the point of its greatest action; therefore, any movement to which the spring might be subjected would also act on the shock absorber at the same time.

Our invention is so arranged that when the springs are carrying a normal load, the upper piston 23 will occupy a position intermediate of the ends of the chamber 20. The air entrapped in either end of the chamber at all times will be at least atmospheric in pressure, inasmuch as any tendency for vacuum would be relieved by an inflow of air at valves 14 or 23. When the springs are put in operation, rod 17 and pistons 22 and 23 are forced upward toward cap 11. The air in the upper end of the chamber 20 becomes proportionately compressed, tending to relieve the spring of a portion of the load. This air is being compressed in the upper end of the chamber 20 between cap 11, and lower piston 22 as valve 26 in the upper piston 23 offers practically no resistance to a downward air pressure, while pistons 22 and 23 are being forced upward. Air is drawn into the lower part of the chamber 20 through valve 33 by the vacuum created below piston 22. The instant the springs start to recoil or expand, and the pressure is relieved in the upper chamber 20, valve 26 in the upper piston 23 is automatically closed, locking the air that has been compressed into the chamber 25. During the recoil or expansion of the spring, the air is compressed between upper piston 23 and the lower cap 12 as valve 27 in piston 22 offers practically no resistance to the upward air pressure. The air thus compressed in the lower chamber 20 and the high pressure chamber 25 relieves the springs of the force of the recoil. It will be seen that after a few movements of the dual pistons, the space between the pistons 22 and 23, as well as the hollow piston rod 17 down to valve 19 will be filled with highly compressed air. This pressure is regulated by adjustments on the exhaust valve 19 to conform to the demands placed upon the shock absorber by the particular vehicle on which it is installed.

This invention is designed to automatically apply itself to varying road conditions, loads and speeds without interfering with the natural and normal resilient action of the springs.

We will now assume that the vehicle to which our invention is attached is being driven over extremely rough roads, and heavy duty is required of the device. The instant a blow from road or bump is delivered to the wheel, the piston rod 17 is forced upward, compressing the air out of upper chamber 20 through valve 26 in piston 23 into chamber 25. Piston 23 would then rest against cap 11, forcing upper end of piston 30 into hollow ball 13, and further compressing the air in chamber 25 through port 28 in hollow piston rod 17 and exhaust through valve 19. Should force be great enough to drive hollow piston rod 17 through upper piston 23, half the normal distance between pistons 22 and 23, port 28 in rod 17 will be closed, preventing further escape of air, which would be entrapped in the chamber 25, thus relieving the springs of the most violent compression. The instant the recoil or rebound begins to take place, rod 17, and piston 22, starts downward until the washer 29 reaches piston 23, when it also moves downward, taking the high pressure on chamber 25 with it. This movable feature in the high pressure chamber 25 eliminates the added recoil that would be obtained from air highly compressed in the trap. As the pistons 22 and 23 move downward, air in lower chamber 20 is compressed into chamber 25 through valve 27 in piston 22. Piston 22 would then rest against the lower cap 12, further compressing the air in chamber 25, forcing it through the opening 28 in rod 17 and exhaust through valve 19. Should force of recoil be great enough to pull opening 28 in piston rod 17 into piston 22, closing port 28, preventing further escape of air from chamber 25, which could be trapped in said chamber effectively, checking any severe rebound.

Our invention is also designed to act as stabilizer, eliminating the greater part of the side sway or listing of a vehicle, encountered on sharp turns or uneven or rough roads.

We claim:

1. In an automatic air shock absorber of the character set forth, the combination of a tubular casing, dual pistons adapted to reciprocate therein, and including piston rod extending through one end of the casing, attachment means connected to the outer end of the piston rod and opposite end of the casing, said pistons being provided with ports therethrough, cutoff valves adapted to control the flow of air through said ports, with valve control to inlet openings at either end of the casing, for alternately admitting air to said cylinder at opposite sides of said pistons, and a port through said piston rod with check valve at outer end co-operating with said ports to control the discharge of air therefrom.

2. A shock absorber of the character shown and described, comprising tubular casing, dual pistons, piston rod, valves, means of attaching to vehicle, and means to limit the said movement of said piston rod, and means to limit the said movement of the dual pistons on piston rod.

3. A shock absorber of the character shown and described, comprising tubular casing, dual pistons, piston rod, valves, means of attaching to vehicle, and means to limit the said movement of said piston rod, and means to limit the said movement of the dual pistons on piston rod. Said pistons comprising a packing device, having a close airtight fit against the inner wall of the casing and on piston rod by means of rigid plates above and below said packing locking in place said device.

4. A shock absorber of the character shown and described, comprising tubular casing, dual pistons, piston rod valves, means of attaching to vehicle, and means to limit the said movement of said piston rod, and means to limit the said movement of the dual pistons on piston rod. Said pistons comprising a packing device, having a close airtight slidable fit against the inner wall of the casing and on piston rod by means of rigid plates above and below said packing locking in place said device, said pistons having check valve opening inwardly into a chamber created by dual pistons having a close airtight slidable fit against inner wall casing and piston rod, a slidable movement on piston rod held apart by coil spring, slidably mounted on piston rod between pistons, creating a movable chamber of highly compressed air by the automatic action thereof as a result of the reciprocation of pistons within the casing.

5. A shock absorber of the character shown and described, comprising tubular casing, dual pistons, piston rod valves, means of attaching to vehicle, and means to limit said movement of said piston rod, and means to limit the said movement of the dual pistons on piston rod. Said pistons comprising a packing device, having a close airtight slidable fit against the inner wall of the casing and on piston rod by means of rigid plates above and below said pistons, locking in place said device, said pistons having check valve opening inwardly into a chamber created by dual pistons having a close airtight slidable fit against inner wall casing and piston rod, a slidable movement on piston rod held apart by coil spring, slidably mounted on piston rod between pistons, creating a movable chamber of highly compressed air by the automatic action thereof as a result of the reciprocation of pistons within the casing, with means to prevent the outflow of air from either end of a casing when air is entrapped therein, and is compressed by dual pistons slidable within the casing and on the piston rod, having port intermediate between the pistons, extending through piston rod, and adjustable valve in lower end of piston rod to control the outflow of air.

ALBERT H. DEMKE.
DANIEL K. POPE.

Witnesses:
C. P. CREAMER,
R. Y. MILLS, Jr.